Figure 1:
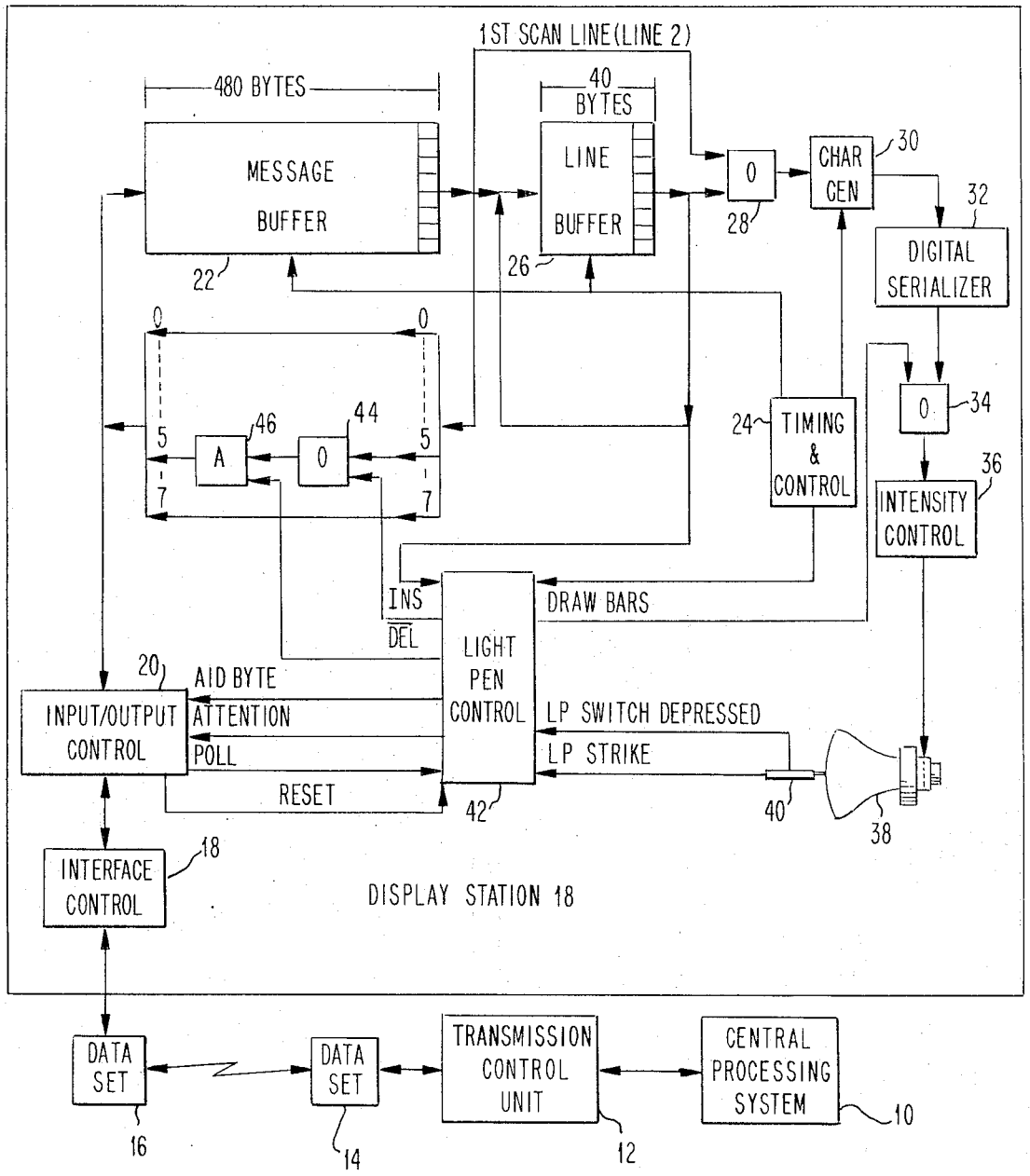
Figure 2:
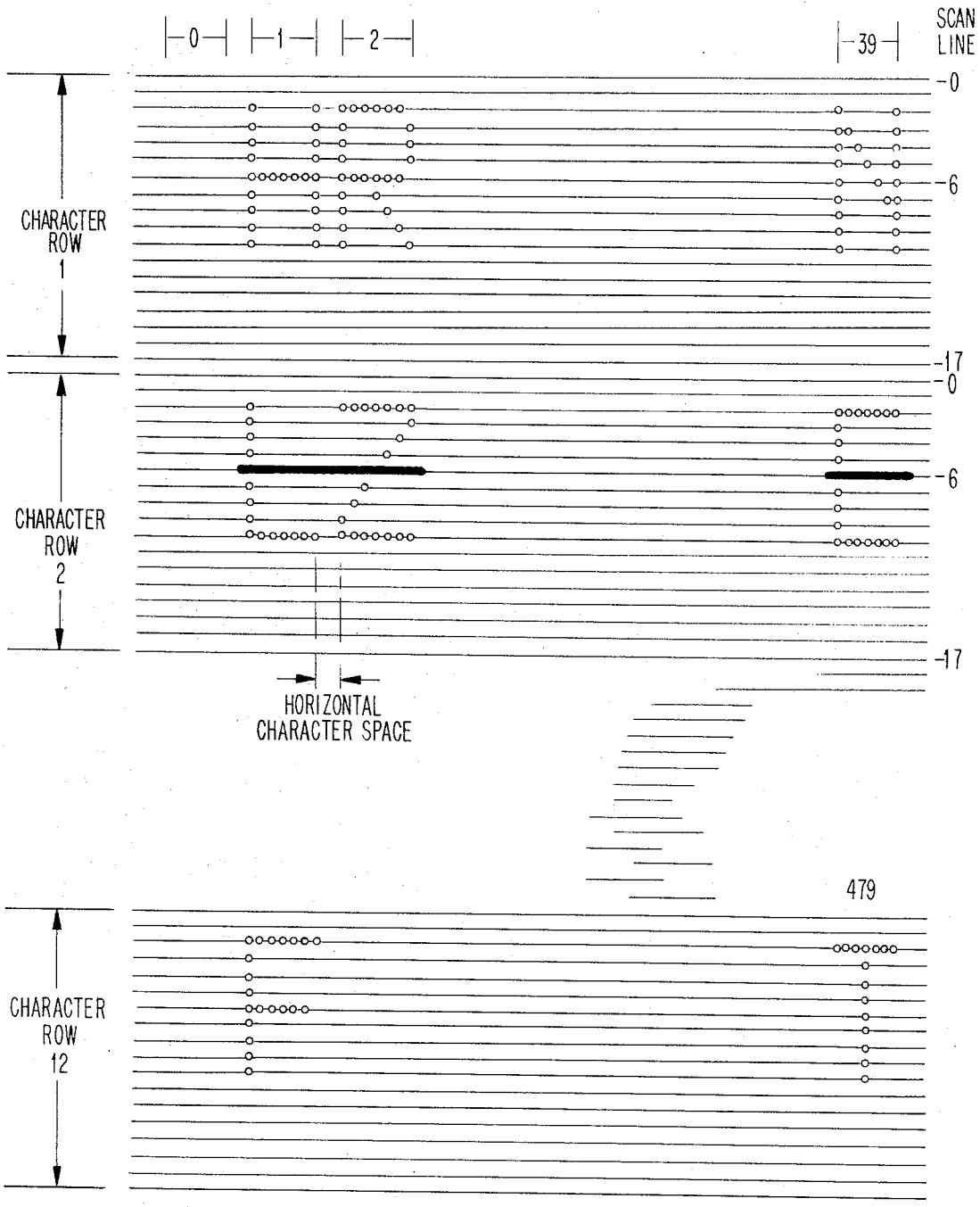

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1569

T915,013

SELECTOR LIGHT PEN SYSTEM

Richard Alfred Jones, Redhook, Theodore Edwin Larson, Saugerties, Kenneth Rogers McNary, Hyde Park, Lawrence Gedney Mosher, Rhinebeck, William Roosevelt Vincent, Poughkeepsie, and James Theodore Zahorsky, Saugerties, N.Y., assignors to International Business Machines Corporation, Armonk, N.Y.

Filed Nov. 17, 1972, Ser. No. 307,759

**Int. Cl. G06f *3/14***

U.S. Cl. 340—324 AD

5 Sheets Drawing. 29 Pages Specification

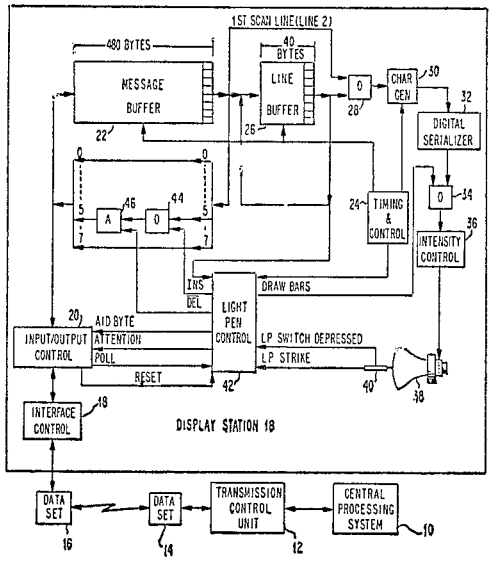

Light pen detection and verification arrangement for a display system allowing operator selection of one or more portions of a formatted message. Format is established by including a non-displayable field separator character followed by a designator character and one or more displayable alphameric characters. The field separator character includes bits which identify the field as being detectable and a tag bit to indicate when detection has been made in the associated field. When a field preceded by a ? is detected, the tag bit of the field separator character is set on and the ? is changed to a > providing a visual verification of the selection. If the original selection is to be changed, the original field is again selected, the tag bit is reset off and the > is returned to a ? to provide visual verification of the deselection. A field which is preceded by a space or null designator character if selected will cause the tag bit of the associated field separator character to be set on with no change occurring in the designator character representation but a signal is generated which will lead to a reading of the tagged fields of the system message.

SELECTOR LIGHT PEN SYSTEM

Filed Nov. 17, 1972 5 Sheets-Sheet 1

SELECTOR LIGHT PEN SYSTEM

Filed Nov. 17, 1972 5 Sheets-Sheet 2

FIG.3

| WARD | ROOM | BED | MENU |
|---|---|---|---|
| ? A | ?1 ?0 | ?1 | ? ROAST BEEF |
| ? B | ?2 ?1 | ?2 | ? GRAVY |
| ? C | ?3 ?2 | ?3 | ? MASHED ?BAKED ?BOILED |
| ? D | ?3 | ?4 | ? GREEN BEANS ?BEETS |
| | ?4 | ?5 | ? MILK ?TEA ?COFFEE |
| | ?5 | ?6 | ? CREAM ?SUGAR |
| | ?6 | ?7 | ? BREAD ?TOAST ?BUTTER |
| | ?7 | ?8 | ? SALT ?PEPPER |
| | ?8 | | ? ULCER ?SPECIAL |
| | ?9 | | |

EXIT

FIG. 4

| WARD | ROOM | BED | MENU |
|---|---|---|---|
| ?A | >1 ?0 | ?1 | > ROAST BEEF |
| >B | ?2 ?1 | ?2 | ? GRAVY |
| ?C | ?3 ?2 | >3 | ? MASHED >~~BAKED~~ ~~?BOILED~~ |
| ~~?D~~ | ~~?3~~ | ~~?4~~ | ~~? GREEN BEANS~~ ~~>BEETS~~ |
| | ~~>4~~ | ~~?5~~ | ~~? MILK~~ ~~?TEA~~ ~~?COFFEE~~ |
| | ?5 | ?6 | ? CREAM ?SUGAR |
| | ?6 | ?7 | ? BREAD ?TOAST ?BUTTE |
| | ?7 | ?8 | ? SALT ?PEPPER |
| | ?8 | | ? ULCER ?SPECIAL |
| | ?9 | | |

EXIT

SELECTOR LIGHT PEN SYSTEM

Filed Nov. 17, 1972 5 Sheets-Sheet 4

SELECTOR LIGHT PEN SYSTEM

Filed Nov. 17, 1972 5 Sheets-Sheet 5

Figure 5A:
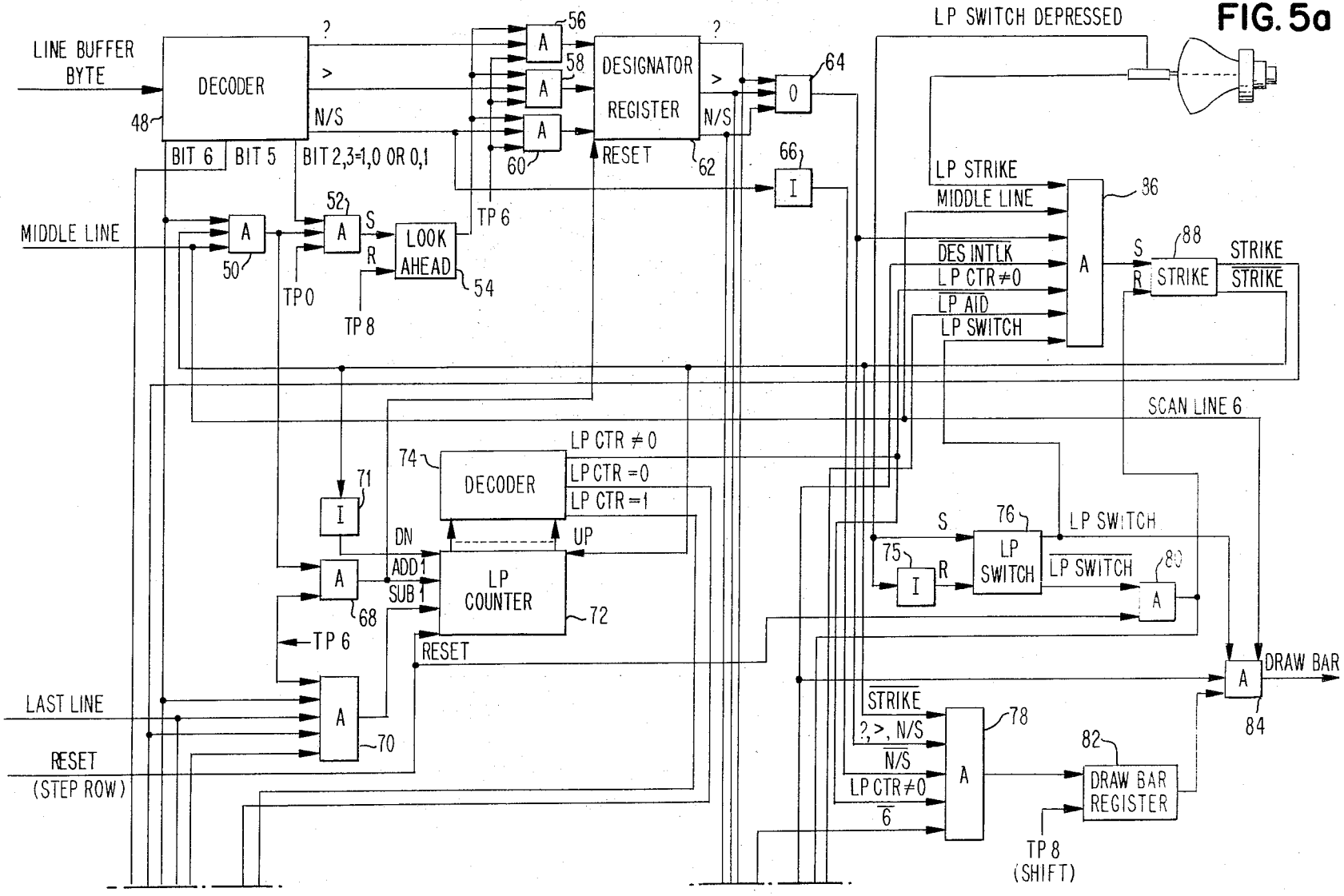
Figures 5, 5B:
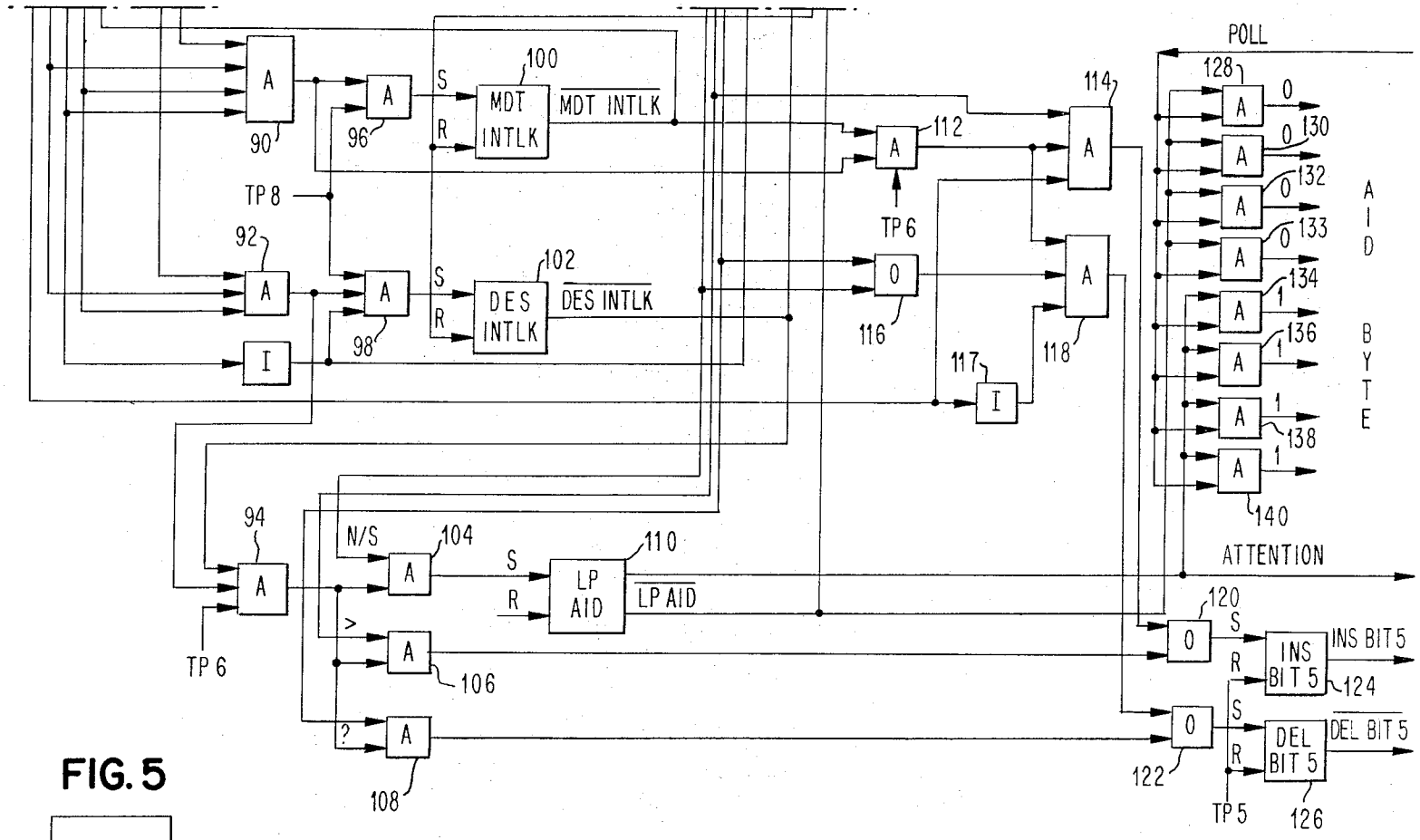

| Fig.5a |
|---|
| Fig.5b |